United States Patent
Bouguetta et al.

(10) Patent No.: US 10,253,234 B2
(45) Date of Patent: Apr. 9, 2019

(54) WELLBORE FLUIDS FOR USE DOWNHOLE

(71) Applicant: M-I L.L.C., Houston, TX (US)

(72) Inventors: Chemsseddine Bouguetta, Houston, TX (US); Roger Wayne Matlock, Lafayette, LA (US); Henry Lee Conn, Houston, TX (US); Robert Bailey, Houston, TX (US); James Friedheim, Spring, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/223,942

(22) Filed: Jul. 29, 2016

(65) Prior Publication Data
US 2017/0029686 A1    Feb. 2, 2017

Related U.S. Application Data

(60) Provisional application No. 62/198,313, filed on Jul. 29, 2015.

(51) Int. Cl.
| | | |
|---|---|---|
| *C09K 8/06* | (2006.01) | |
| *C09K 8/36* | (2006.01) | |
| *C09K 8/03* | (2006.01) | |
| *C09K 8/26* | (2006.01) | |

(52) U.S. Cl.
CPC .................................. *C09K 8/032* (2013.01)

(58) Field of Classification Search
None
See application file for complete search history.

(56) References Cited

U.S. PATENT DOCUMENTS

| | | | | |
|---|---|---|---|---|
| 3,850,248 A | * | 11/1974 | Carney | C09K 8/424 166/291 |
| 4,092,407 A | * | 5/1978 | Rohrborn | C09K 8/032 423/633 |
| 4,108,779 A | * | 8/1978 | Carney | B01F 17/0085 166/291 |
| 5,069,298 A | * | 12/1991 | Titus | E21B 4/003 175/107 |
| 2008/0107513 A1 | | 5/2008 | Curtis et al. | |
| 2008/0108528 A1 | | 5/2008 | Matlock et al. | |
| 2008/0169130 A1 | * | 7/2008 | Norman | C09K 8/05 175/65 |
| 2009/0192052 A1 | * | 7/2009 | Zhang | C09K 8/032 507/140 |

FOREIGN PATENT DOCUMENTS

| | | |
|---|---|---|
| WO | 2012/085516 A2 | 6/2012 |
| WO | 2013/060799 A1 | 5/2013 |

OTHER PUBLICATIONS

Geldart, et al., "Types of Gas Fluidization," Powder Technology, 7, 1973, pp. 285-292.
International Search Report for PCT/US2016/044728 dated Nov. 1, 2016.

* cited by examiner

*Primary Examiner* — John J Figueroa
(74) *Attorney, Agent, or Firm* — David J. Smith

(57) ABSTRACT

A wellbore fluid may include a base fluid, and a ground weight material comprising barite and quartz and having a $d_{50}$ between about 4 and 8 microns and a $d_{90}$ between about 15-25 microns. The ground weight material of the wellbore fluid may have a specific gravity of less than or equal to about 4.2.

18 Claims, 4 Drawing Sheets

WELLBORE FLUIDS FOR USE DOWNHOLE

BACKGROUND

Wellbore fluids serve many important functions throughout the process in drilling for oil and gas. One such function is cooling and lubricating the drill bit as it grinds though the earth's crust. As the drill bit descends, it generates "cuttings," or small bits of stone, clay, shale, or sand. A wellbore fluid serves to transport these cuttings back up to the earths surface. As drilling progresses, large sections of pipe called "casings" are inserted into the well to line the borehole and provide stability. One of skill in the art should appreciate these uncased sections of the borehole, which are exposed to the high pressures of the reservoir, must be stabilized before casing can be set; otherwise, a reservoir "kick" or, in the extreme case, a "blowout"—a catastrophic, uncontrolled inflow of reservoir fluids into the wellbore—may occur. A wellbore fluid, if monitored properly, can provide sufficient pressure stability to counter this inflow of reservoir fluids.

A critical property differentiating the effectiveness of various wellbore fluids in achieving these functions is density, or mass per unit volume. The wellbore fluid must have sufficient density in order to carry the cuttings to the surface. Density also contributes to the stability of the borehole by increasing the pressure exerted by the wellbore fluid onto the surface of the formation downhole. The column of fluid in the borehole exerts a hydrostatic pressure (also known as a head pressure) proportional to the depth of the hole and the density of the fluid. Therefore, one can stabilize the borehole and prevent the undesirable inflow of reservoir fluids by carefully monitoring the density of the wellbore fluid to ensure that an adequate amount of hydrostatic pressure is maintained.

It has been long desired to increase the density of wellbore fluids, and, not surprisingly, a variety of methods exist. One method is adding dissolved salts such as sodium chloride, calcium chloride, and calcium bromide in the form of an aqueous brine to wellbore fluids. Another method is adding inert, high-density particulates to wellbore fluids to form a suspension of increased density. These inert, high-density particulates often are referred to as "weighting agents" and typically include powdered minerals of barite, calcite, or hematite.

Naturally occurring barite (barium sulfate) has been utilized as a weighting agent in drilling fluids for many years. Drilling grade barite is often produced from barium sulfate containing ores either from a single source or by blending material from several sources. It may contain additional materials other than barium sulfate mineral and thus may vary in color from off-white to grey or red brown. The American Petroleum Institute (API) has issued international standards to which ground barite must comply. These standards can be found in API Specification 13A, Section 2.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes a base fluid, and a ground weight material comprising barite and quartz and having a $d_{50}$ between about 4 and 8 microns and a $d_{90}$ between about 15-25 microns.

In another aspect, embodiments disclosed herein relate to a wellbore fluid that includes a base fluid and a weight material, where the weight material has a weight percent of quartz ranging between four (4) and twelve (12) percent, and wherein the wellbore fluid has a viscosity of at least 20 lbs/100 $ft^2$ between 30 and 100 rpm.

Other aspects and advantages of the claimed subject matter will be apparent from the following description and the appended claims.

DETAILED DESCRIPTION

Figure 1:
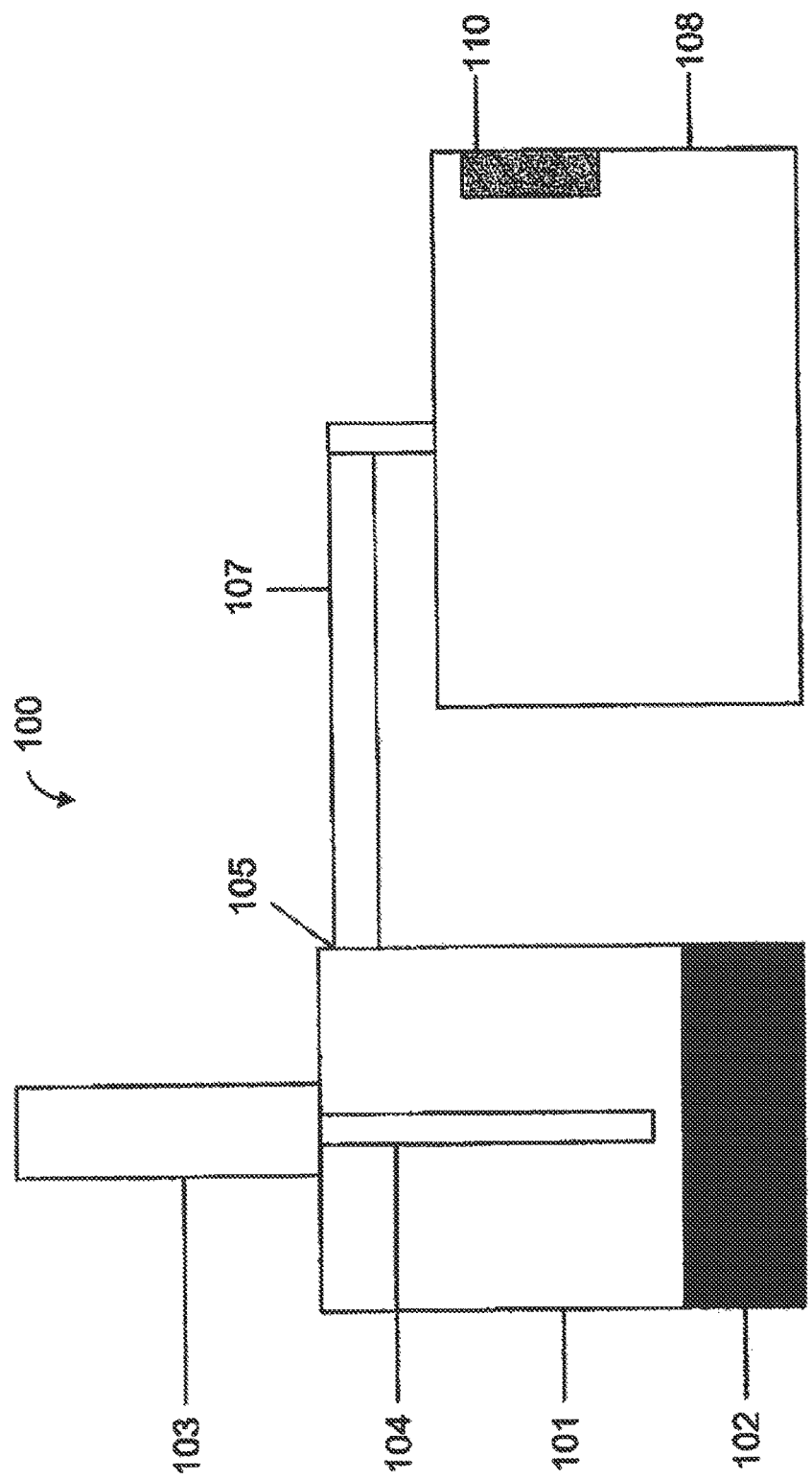
FIG. 1 is an illustration of a pneumatic transfer device for the transfer of finely ground weight material in accordance with an embodiment of the present disclosure.

In one aspect, embodiments disclosed herein relate to methods for transferring finely ground weight materials prior to their use in, among other things, wellbore fluids. More specifically, embodiments disclosed herein relate to the transfer of finely ground barite prior to its use in, among other things, wellbore fluids. Additionally, embodiments disclosed herein relate to wellbore fluids containing the finely ground weight materials and methods for formulating and utilizing the same downhole. The weight materials, also referred to as weighting agents, according to this disclosure may provide for the ability to use an appropriately weighted wellbore fluid that is thinner and less viscous during wellbore operations than fluids formulated with conventional weighting agents. These wellbore fluids may maintain excellent dispersion of the weighting agent therein and possess better sag properties than fluids using conventionally sized weighting agents. Further, despite their smaller particle size distribution than conventional weighting agents, weighting agents according to this disclosure may be efficiently transferred using pneumatic conveyance methods allowing for extensive cost savings related to the reductions in time and man power required during their life-cycle from production to their use in a wellbore fluid.

Weighting Agents

In the field, the term "weighting agent" or "weight material" may be used synonymously to refer to high-specific gravity solid material used to increase density of a drilling mud or other wellbore fluid. Weighting agents may include, for example, barium sulphate (barite), calcium carbonate, dolomite, ilmenite, hematite, olivine, siderite, and strontium sulphate, or any other material known to one of ordinary skill in the art. Weighting agent is ground from a weight material ore, and the weight material ore may include any of the above mentioned materials as source materials. Additionally, unless the weight material ore is purified or processed prior to its grinding, the weight material may contain small amounts of other minerals that are present as inclusions in the source ore. For example, barite ore may contain from about 0.5 to 12 weight percent of quartz and the weighting agent resulting from its grinding may likewise contain a similar amount therein.

When grinding weighting agents, the smaller diameter particles are often referred to as "fines" and typically include solid particles ranging in size from about 1 to 50 microns. However, those of ordinary skill in the art will appreciate that fines may also include weighting agents with diameters of less than 1 micron. Furthermore, those of ordinary skill in the art will appreciate that the selection of the particular weighting agent for a given drilling operation may depend on the density of the material that is desired. Other considerations may influence the choice of a product such as cost, availability, power required for grinding, and residual effects on the wellbore.

It is known in the art that during the drilling process, weighting agents, as well as cuttings, can create sedimentation or "sag" that can lead to a multitude of well-related problems such as lost circulation, loss of well control, stuck pipe, and poor cement jobs. The sag phenomenon arises from the settling out of particles from the wellbore fluid. This settling out causes significant localized variations in mud density or "mud weight," both higher and lower than the nominal or desired mud weight. The phenomenon generally arises when the wellbore fluid is circulating bottoms-up after a trip, logging, or casing run. Typically, light mud is followed by heavy mud in a bottoms-up circulation.

Sag is influenced by a variety of factors related to operational practices or drilling fluid conditions such as: low-shear conditions, drillstring rotations, time, well design, drilling fluid formulation and properties, and the mass of weighting agents. The sag phenomenon tends to occur in deviated wells and is most severe in extended-reach wells. For drilling fluids utilizing particulate weighting agents, differential sticking or a settling out of the particulate weighting agents on the low side of the wellbore is known to occur.

Particle size and density determine the mass of the weighting agents, which in turn correlates to the degree of sag. Thus it follows that lighter and finer particles, theoretically, will sag less. However, the conventional view is that reducing weighting agent particle size causes an undesirable increase in the fluid's viscosity, particularly its plastic viscosity. Plastic viscosity is generally understood to be a measure of the internal resistance to fluid flow that may be attributable to the amount, type or size of the solids present in a given fluid. It has been theorized that this increase in plastic viscosity attributable to the reduction in particle size—and thereby increasing the total particle surface area—is caused by a corresponding increase in the volume of fluids, such as water or drilling fluid, adsorbed in the particle surfaces. Thus, particle sizes below 10 μm have been disfavored.

Because of the mass of the weighting agent, various additives are often incorporated to produce a theology sufficient to allow the wellbore fluid to suspend the material without settlement or "sag" under either dynamic or static conditions. Such additives may include a gelling agent, such as bentonite for water-based fluid or organically modified bentonite for oil-based fluid. A balance exists between adding a sufficient amount of gelling agent to increase the suspension of the fluid without also increasing the fluid viscosity resulting in reduced pumpability. One may also add a soluble polymer viscosifier such as xanthan gum to slow the rate of sedimentation of the weighting agent.

According to current API standards, particles having an effective diameter less than 6 microns may make up no more than 30% by weight of the total weighting agent to be added to the drilling fluid. Thus, while it is acceptable to have some fine particles in the weighting agent, it has been conventionally preferred that the relative quantity of smaller particles be minimized because it is thought that a reduction in the size of particles in drilling fluids would lead to an undesirable increase in viscosity.

Further, a significant impediment to the use of larger relative ratios of fines in a drilling fluid relates to the post-production treatment and transference of the fines. Generally, as fines are stored, they have a natural tendency to self-compact. Compaction occurs when the weight of an overlying substance results in the reduction of porosity by forcing the grains of the substance closer together, thus expelling fluids (e.g., air or water), from the interstitial spaces between the grains. However, when multiple substance fines are intermixed, compaction may occur when a more ductile fine deforms around a less ductile fine, thereby reducing porosity and resulting in compaction.

Because finely ground barite particles ($d_{90}$ between about 45-50 microns) have a tendency to self-compact during storage, subsequent transference of finely ground particles, as described above, poses problems to manufacturers, transporters, and end users of the fines. See D. Geldart, D, *Types of Gas Fluidization*, Powder Technology, 7 1973 at 285-292. Typically, barite fines are stored and transported in large vessels in which compaction is a common occurrence. Frequently, barite fines compact within a vessel during transport such that when the fines are ready to be unloaded, the fines have to be manually dug out of the vessel. The process of manually removing the fines is labor intensive, costly, and inefficient. Furthermore, because the vessels may be openly exposed to the air, the barite fines as they are removed may result in barite dust that may escape the vessel. As a result, a substantial portion of barite weighting agent may be lost during transference.

Typically, finely ground weight material (i.e., fines) are stored in large vessels during transportation from a manufacturing plant to a distribution center or drill site. Embodiments described below disclose methods for transferring finely ground weight materials between vessels. Generally, finely ground weight material includes weight material such as barite that is ground to a specified size, which may be reflected as a volume percent. For example, in certain embodiments, the specified size of the finely ground weight material may be particles having a $d_{90}$ value between about 15-25 microns, meaning that 90% of the particles (by volume) making up the weighting agent have a size less than a value between about 15-25 microns.

One of ordinary skill in the art will appreciate that while a $d_{90}$ value between about 15-25 microns may be desirable in certain weighting agents, other size ranges, in addition to or separately from the $d_{90}$ value above, may also provide benefits in the present disclosure. Examples of other size ranges which may be used in some embodiments may include finely ground weighting agents with a $d_{10}$ between about 0.75-1.5 microns, or a $d_{25}$ between about 1.75 to 3 microns, or a $d_{50}$ between about 4-8 microns, or a $d_{75}$ between about 12-14 microns, or a $d_{85}$ between about 15-17 microns, or a $d_{95}$ between about 24-34 microns, or a $d_{98}$ between about 32-60 microns, or a $d_{99.5}$ between about 48-120 microns. In more particular embodiments, other size ranges for finely ground weighting agents may include a $d_{50}$ between about 5-7 microns, or a $d_{90}$ value between about 18-22 microns, or a $d_{98}$ between about 32-42 microns, or a $d_{99.5}$ between about 48-62 microns. However, those of ordinary skill in the art will realize that variations to the size of ground weighting agents may vary according to the requirements of a certain drilling fluid and/or drilling operation.

As discussed above, barite weighting agents that are ground from ore may include significant amounts of quartz depending upon the geology associated with the source of the ore. Quartz has a higher hardness value than barite and therefore the quartz that is included in the weighting agent will more readily resist being broken down during the grinding processes subjected on the ore. This resistance to grinding results in what is known as a "silica tail" in the particle size distribution of the ground weighting agent, meaning the tail end, or larger size range of the particles, is often relatively highly populated by the quartz particles. Thus, the average particle size of the quartz portion may be larger than the average particle size of the barite portion of the weight material. In one or more embodiments, a barite based weight material with the particle size distributions noted above may include about 4-12 weight percent of quartz therein, or in some embodiments may include about 5-10 or 5-7 weight percent of quartz therein. In some embodiments, if the barite ore does not contain an amount of quartz within the above range, quartz may be added in with the ore prior to (or during) the grinding so that the amount of quartz in the final weighting material may be in the ranges disclosed above. In weighting materials including the above amounts of silica (quartz) therein, the resulting specific gravity (SG) of the weighting material may be less than or equal to about 4.2, in some embodiments about 4.1, because quartz has a lower value for specific gravity than barite.

Method of Pneumatically Transferring Weighting Agents

Figure 2:
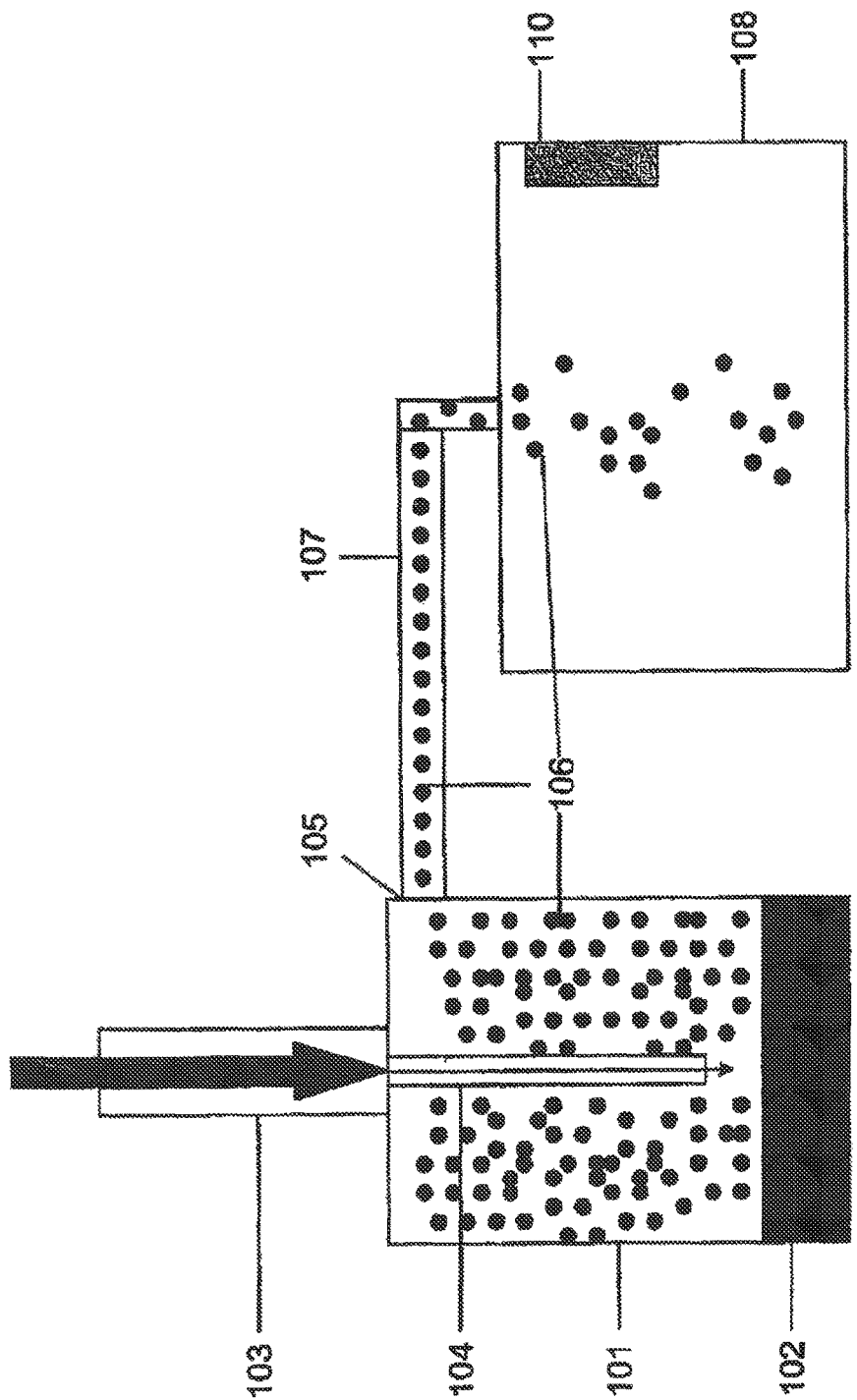
FIG. 2 is an illustration of a pneumatic transfer device for the transfer of finely ground weight material during use in accordance with an embodiment of the present disclosure.

Referring initially to FIG. 1 and FIG. 2 together, a method of transferring fines or finely ground weight materials in accordance with an embodiment of the present disclosure is shown. In this embodiment, pneumatic transfer system 100 including a pneumatic transfer vessel 101 is shown holding a supply of fines 102 prior to transference. Pneumatic transfer vessel 101 may include an air inlet 103 and an air inlet extension 104 to supply air to the vessel. Air inlet 103 may be connected to an air supply device (e.g., an air compressor) (not shown) such that air may be directly injected into pneumatic transfer vessel 101. Pneumatic transfer vessel 101 may further include a fines exit 105.

One of ordinary skill in the art will realize that different size and shape pneumatic transfer vessels 101 may be desirable for the transference of different fines. Specifically, in one embodiment, it may be desirable to use a tall and relatively narrow pneumatic transfer vessel 101 so that air may be injected directly above a majority of the fines 102. In alternate embodiments, it may be desirable to use a short and relatively wide pneumatic transfer vessel 101 so that the distance between the fines 102 and fines exit 105 is relatively small.

In the illustrated embodiment, air inlet extension 104 protrudes from air inlet 103 into pneumatic transfer vessel 101 so that fines 102 are in close proximity to air inlet extension 104. By allowing air inlet extension 104 to inject air in close proximity to fines 102, the air may better penetrate compacted fines 102 so that better dispersion throughout pneumatic transfer vessel 101 occurs. As illustrated, air inlet extension 104 is of smaller diameter than air inlet 103. One of ordinary skill in the art will realize that by providing a smaller air inlet extension 104, the air may be focused on a smaller region of pneumatic transfer vessel 101. In alternate embodiments a directional device (not illustrated) may be attached to air inlet extension 104 so as to direct air to a specific region of pneumatic storage vessel 101. While not important in a small pneumatic transfer vessel 101, in a large vessel, wherein the diameter of air inlet extension 104 is substantially smaller than the diameter of pneumatic transfer vessel 101, the ability to direct the flow of air may allow a greater percentage of compacted fines 102 to be transferred.

As air flows into air inlet 103 through air inlet extension 104 and into pneumatic transfer vessel 101, the air contacts compacted fines 102 and results in aerated fines 106. Aerated fines 106 may flow up the sides of pneumatic transfer vessel 101 and through fines exit 105, past the exit point and into a transfer line 107 connecting pneumatic transfer vessel 101 and storage vessel 108. As air pressure increases in pneumatic transfer vessel 101, the transfer rate of aerated fines 106 may also increase, thereby forcing aerated fines 106 through transfer line 107 and into storage vessel 108. Storage vessel 108 may be any vessel capable of holding fines. However, one of ordinary skill in the art will realize that it may he desirable that storage vessel 108 is configured to prevent aerated fines 106 from escaping the system. In one embodiment, storage vessel 108 may include a sealed, vented system 110 so as to trap aerated fines in storage vessel 108 while providing an escapes means for air, so that transference occurs.

Figure 3:
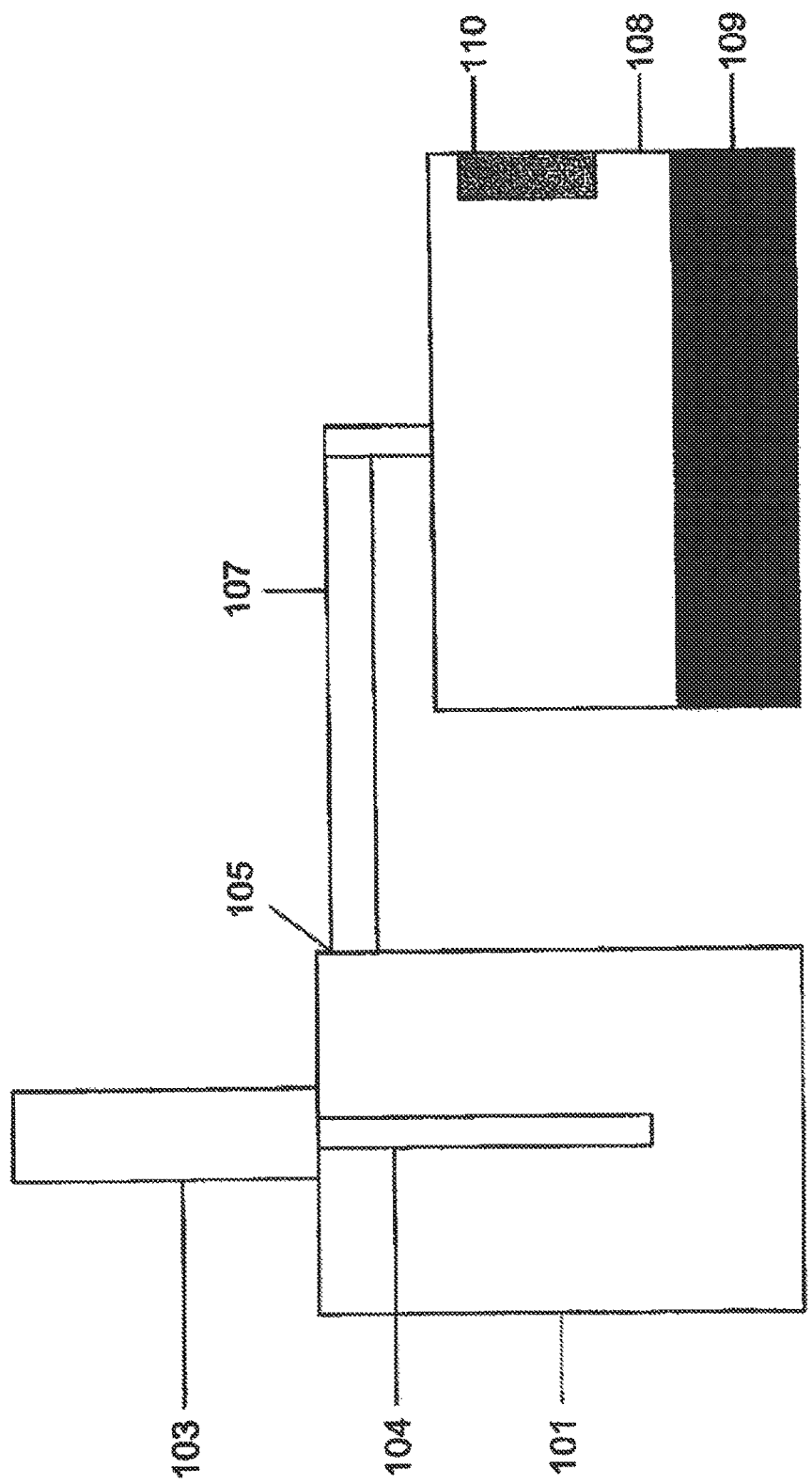
FIG. 3 is an illustration of a pneumatic transfer device for the transfer of finely ground weight material after use in accordance with an embodiment of the present disclosure.

Referring now to FIG. 3, a method of transferring fines or finely ground weight materials in accordance with an embodiment of the present disclosure is shown. As described relative to FIGS. 1 and 2, as aerated fines 106 (of FIG. 2) are removed from transfer vessel 101 to storage vessel 108, the fines may settle as collected fines 109. Because collected fines 109 have undergone pneumatic transfer, such fines may remain in a less compacted form than original fines 102 during transference and/or prior to use. Thus, removal of collected fines 109 from storage vessel 108 may provide a more efficient process for transferring collected fines 109 between storage vessel 108 and where collected fines 109 are used.

During transference of the fines from transfer vessel 101 to storage vessel 108, some of the aerated fines may not recollect as collected fines 109. For example, some of the aerated fines may remain along the inner diameter of transfer vessel 101, in transfer line 107, or along any other internal component of the pneumatic transfer system. The efficiency of the pneumatic transfer may be represented by relating the weight of finely ground weight materials in the transfer vessel (i.e., the initial vessel) to the weight of finely ground weight materials transferred to the storage vessel (i.e. the destination vessel). In one or more embodiments, the efficiency of the pneumatic transference may be at least 92%, or at least 95%, or at least 97% in some embodiments.

However, because the system may be configured to prevent aerated fines 106 from escaping the system, even if not all of the aerated fines 106 transfer from transfer vessel 101 to storage vessel 108, the fines remain in the system for further collection. Thus, a second pneumatic transfer cycle may be used to further transfer fines from transfer vessel 101 or any other component of the system, and the same or a different storage vessel 108 from the initial pneumatic transfer. One of ordinary skill in the art will realize that any number of pneumatic transfers may be used to reduce the amount of residual fines left from preceding transfers, thereby increasing the efficiency of such transference.

Now referring to FIGS. 1, 2, and 3 collectively, while transfer vessel 101 has been described as a vessel wherein fines 102 are stored prior to shipping, it should be noted that methods in accordance with pneumatic transfer system 100 may be used to transfer fines 102 between any vessels. For example, in one embodiment, a transfer vessel 101 may include a collection vessel for product removed from the production line. In an alternate embodiment, a transfer vessel 101 may include a vessel holding fines 102 prior to use at a drilling location and/or drilling fluid production facility. Thus, one of ordinary skill in the art will realize that the above described method for transferring fines 102 may be useful anytime fines 102 are transferred between two vessels.

Figure 4:
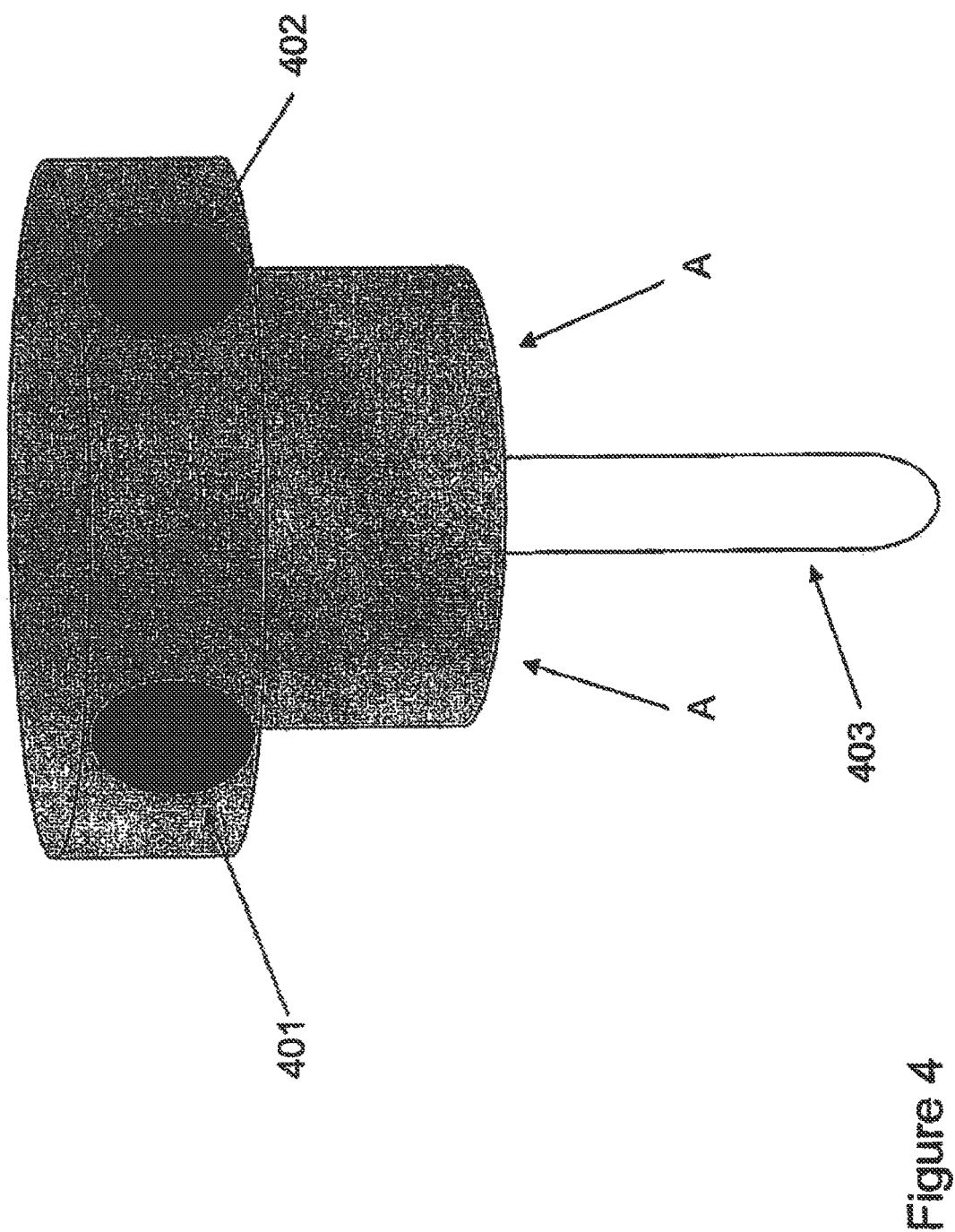
FIG. 4 is an illustration of a pneumatic transfer device for the transfer of finely ground weight material in accordance with an embodiment of the present disclosure.

Referring now to FIG. 4, a device for transferring fines or finely ground weight materials in accordance with an embodiment of the present disclosure is shown, In view of the above, one of ordinary skill in the art will realize that systems in accordance with embodiments described herein may include retroactive attachments to preexisting systems. For example, one embodiment of the present disclosure may include a system using multiple vessels already in use for the transference of fines. In such a preexisting system, a pneumatic transfer device including a means for injecting air into one of the vessels, thereby forcing the fines into the second vessel, may be attached to one of the existing vessels. In such a system, a device including an air inlet 401, an air exit 402, and a fines exit 403 may be attached to a transfer vessel (not shown).

In this embodiment, air inlet 401 may be attached to any means for injecting air, (e.g., an air compressor). One of ordinary skill in the art will realize that it may be preferable that the air injection device (not shown) allow the pressure of air injected into air inlet 401 to be adjustable. Depending on the compaction of the fines and the content of fines additives, the air flow may be adjusted to provide the most efficient level of aeration. In certain embodiments, it may be desirable to keep the air pressure at about 10-80 psi, and to more tailored ranges, such as about 60-80 psi, or at about 20-40 psi, or at about 10-20 psi, depending on the type of vessel used in the conveyance. Specifically, a truck may convey at a lower pressure than a boat or rig, and both the truck and boat or rig may be at lower pressures than a storage silo. In one or more embodiments, the weight material of the present disclosure may be pneumatically conveyed at each of these discrete sub-ranges. One of ordinary skill in the art will realize that applying too high of a pressure to the fines may cause the fines to further pack-off thereby preventing the aeration necessary for the pneumatic transfer of the fines. However, depending on the volume of the storage vessel, and the specifications of a given transfer operation, any pressure capable of aerating the fines in an efficient manner is within the scope of the present disclosure.

Still referring to FIG. 4, as air enters air inlet 401 at a specified pressure, internal piping (not shown) directs the air into air exit 402 and into contact with the fines in the vessel. As described above, the fines may become aerated, and as such, may be forced upwardly (illustrated as "A") through internal piping (not shown) wherefrom the fines may exit the vessel through fines exit 403. In one embodiment, fines exit 403 may be attached to a second vessel, while in alternate embodiments, fines exit 403 may be attached to production equipment used in the production of, for example, drilling fluids.

Those of ordinary skill in the art will appreciate that the pneumatic transfer of fines may occur between varied aspects of a drilling operation. In one embodiment, fines may be pneumatically transferred between a pneumatic vessel and a storage vessel. In other embodiments, fines may be pneumatically transferred between a plurality of pneumatic vessels, or between transportation vessels and storage and/or pneumatic transfer vessels. Exemplary transportation vessels include boats and bulk storage trucks as are known in the art. In still other aspects of the disclosure, fines may be transferred at a manufacturing facility, a drilling fluid production facility, and/or a drilling location. As such, the pneumatic transference of fines may occur on both land and offshore drilling rigs.

In certain embodiments, the finely ground weight materials or fines may be created at a manufacturing facility via appropriate grinding and processing operations and then pneumatically transferred to storage vessels. The storage vessels in such an embodiment may also be pneumatic vessels. Such pneumatic vessels may then be transported via a transportation vessel, such as a boat, to an offshore rig. After transportation to an offshore rig, the fines may be pneumatically transferred to storage vessels on the offshore rig, such that the fines may be used in mixing drilling fluids. In other embodiments, the transportation vessel may include a bulk storage truck. In such an embodiment, the bulk storage truck may deliver the produced fines to a land-based rig or distribution site, such that the fines may be pneumatically transferred to storage containers at the rig or distribution site, or otherwise the fines may be directly transferred for use in mixing drilling fluids. In some embodiments, the storage container may be a storage silo capable of storing over 250 tons of weight materials. Those of ordinary skill in the art will appreciate that any number of additional pneumatic transportations may occurring prior to adding the weighting agents to a drilling fluid.

Wellbore Fluid Formulation

In accordance with at least one embodiment, the weighting agents discussed above may be used in a wellbore fluid formulation. Thus, in one or more embodiments, the weighting agents may be pneumatically conveyed at a drilling location where the particulates may be subsequently added to a base fluid for formulation into a wellbore fluid. The wellbore fluid may be a water-based fluid or an oil-based fluid, including an invert emulsion or a direct emulsion fluid.

Water-based wellbore fluids may have an aqueous fluid as the base solvent and a particulate weighting agent as discussed above. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one or more embodiments, the density of the drilling fluid may be controlled by increasing the salt concentration in the brine (up to saturation). In particular embodiments, a brine may include halide or carboxylate salts of mono- or divalent cations of metals, such as cesium, potassium, calcium, zinc, and/or sodium.

The invert emulsion wellbore fluids may include an oleaginous continuous phase, a non-oleaginous discontinuous phase, and a weighting agent as discussed above. A direct emulsion may include a non-oleaginous continuous phase, an oleaginous discontinuous phase, and a weighting agent as discussed above. One of ordinary skill in the art would appreciate that the weighting agents described above may be modified in accordance with the desired application. For example, modifications may include the addition of a hydrophilic/hydrophobic dispersant to the surface of the weighting agent prior to its formulation into a wellbore fluid.

The oleaginous fluid may be a liquid and more specifically is a natural or synthetic oil and more preferably the oleaginous fluid is selected from the group including diesel oil; mineral oil; a synthetic oil, such as hydrogenated and unhydrogenated olefins including poly(alpha-olefins) linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment, the amount of oleaginous fluid is from about 30% to about 95% by volume and more preferably about 40% to about 90% by volume of the invert emulsion fluid. The oleaginous fluid, in one embodiment, may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus, in one embodiment, the amount of non-oleaginous fluid is less that about 70% by volume and preferably from about 1% to about 70% by volume. In another embodiment, the non-oleaginous fluid is preferably from about 5% to about 60% by volume of the invert emulsion fluid. The fluid phase may include either an aqueous fluid or an oleaginous fluid, or mixtures thereof.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

Conventional methods can be used to prepare the drilling fluids disclosed herein in a manner analogous to those normally used, to prepare conventional water- and oil-based drilling fluids. In one embodiment, a desired quantity of water-based fluid and a suitable amount of the weighting agent are mixed together and the remaining components of the drilling fluid added sequentially with continuous mixing. In another embodiment, a desired quantity of oleaginous fluid such as a base oil, a non-oleaginous fluid and a suitable amount of the weighting agent are mixed together and the remaining components are added sequentially with continuous mixing. An invert emulsion may be formed by vigorously agitating, mixing or shearing the oleaginous fluid and the non-oleaginous fluid.

Other additives that may be included in the wellbore fluids disclosed herein include for example, wetting agents, organophilic clays, viscosifiers fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Upon incorporation of the weighting agents of the present disclosure and other fluid components into a fluid, the wellbore fluids of the present disclosure may be formulated to have beneficial sag properties, including resistance to sag or minimal sag under both static and dynamic conditions. Specifically, a fluid of the present disclosure may have a viscosity between 12,000 and 20,000 cP at 0.17 $s^{-1}$ and 1,500 and 2,500 cP at 1.7 $s^{-3}$, which may indicate low potential for sag during static conditions. Further, the fluid may also have a viscosity of at least 20 lbs/100 $ft^2$ between 30 and 100 rpm, which may indicate low potential for sag during dynamic conditions. Additionally, the fluid may be able to be formulated to be thinner, i.e., with a reduced viscosity and with reduced sag potential for both dynamic and static conditions (as shown in the table below), as compared to conventional fluids with weighting agents having larger particle sizes. For example, whereas a conventional fluid may have a low shear rate viscosity represented by the 6 rpm of a rotational viscometer of 11-13 dial reading, a fluid according to the present disclosure may have a low shear viscosity rate represented by the 6 rpm of a rotational viscometer of 7-10 dial reading.

|  | API Barite Formulations | | | Fluids with Finer PSD Barite | | |
| --- | --- | --- | --- | --- | --- | --- |
| Dial Reading @ 100 rpm | 26.2 | 23.3 | 23.1 | 17.0 | 15.7 | 25.2 |
| Dial Reading @ 6 rpm | 9.6 | 8.6 | 11.2 | 7.0 | 6.7 | 11 |
| Viscosity 1 rpm (cP) | 2056 | 1762 | 2878 | 1703 | 1644 | 2820 |
| Viscosity 0.1 rpm (cP) | 14686 | 11749 | 11161 | 11748 | 15273 | 13511 |
| VSST (ppg) | 2.47 | 3.19 | 2.9 | 1.24 | 1.39 | 0.28 |

Methods of Drilling

During the drilling of a wellbore, various fluids are typically used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate. Other wellbore fluids include completion fluids used in the wellbore following drilling operations. Completion fluids broadly refer to any fluid pumped down a well after drilling operations have been completed, including fluids introduced during acidizing, perforating, fracturing, workover operations, the installation of sand screens, gravel packing, etc.

The wellbore fluids including the finely ground weight materials discussed above may be circulated downhole during the drilling of a wellbore. Further, and as discussed above, these wellbore fluids may have beneficial sag properties, including resistance to sag or minimal sag under both static and dynamic conditions that may be particularly beneficial during a horizontal drilling operation.

EXAMPLES

To test the pneumatic transference of finely ground weight materials according to the present disclosure, four tests were performed by transferring finely ground weight materials between a pneumatic vessel and a storage vessel. In these tests, the pneumatic vessel was a truck containing over 20 tons of finely ground weight material therein. The storage vessel was a storage silo capable of containing roughly 300 tons of finely ground weight material therein, and the truck had travelled roughly 300 miles from the production facility of the finely ground weight materials to the location of the storage vessel. Thus, significant compaction of the weight materials, as described above, occurred prior to the materials transference The pneumatic transference was performed using an air pressure of roughly 15 psi.

Although the size distributions of the weight materials may vary slightly from shipment to shipment, each of the examples generally have the following characteristics: $d_{10}<1.3$ micron, $d_{25}<3$ micron, $d_{50}<7$ micron, $d_{75}<13$ micron, $d_{85}<17$ micron, $d_{90}<19$ micron, $d_{95}<24$ microns, $d_{98}<32$ microns, and a $d_{99.5}<48$ microns. The results of the transference examples are shown in Table 1 below.

TABLE 1

| Example | Amount Delivered (lbs) | Amount Offloaded (lbs) | Efficiency (%) | Transfer Time (hr) |
| --- | --- | --- | --- | --- |
| 1 | 43920 | 42900 | 97.7 | 0.75 |
| 2 | 43000 | 42000 | 97.7 | 0.5 |
| 3 | 47560 | 45900 | 96.5 | 1.75 |
| 4 | 47780 | 47000 | 98.4 | 1.5 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A wellbore fluid comprising:
    a base fluid; and
    a barite-based ground weight material ground from barite ore such that the barite-based ground weight material comprises barite and quartz and has a $d_{50}$ between about 4-8 microns and a $d_{90}$ between about 15-25 microns, wherein the quartz has a larger average particle size than the barite and the barite-based ground weight material has a weight percent of quartz of about 4-12 percent.

2. The wellbore fluid of claim 1, wherein the barite-based ground weight material has a specific gravity of less than or equal to about 4.2.

3. The wellbore fluid of claim 1, wherein the barite-based ground weight material has a weight percent of quartz ranging between about 5-7 percent.

4. The wellbore fluid of claim 1, wherein the barite-based ground weight material has a $d_{90}$ between about 18-22 microns.

5. The wellbore fluid of claim 1, wherein the barite-based ground weight material has a $d_{50}$ between about 4-8 microns.

6. The wellbore fluid of claim 1, wherein the barite-based ground weight material has a $d_{75}$ between about 12-14 microns.

7. The wellbore fluid of claim 1, wherein the barite-based ground weight material has a $d_{85}$ between about 15-17 microns.

8. The wellbore fluid of claim 1, wherein the barite-based ground weight material has a $d_{95}$ between about 24-34 microns.

9. The wellbore fluid of claim 1, wherein the barite-based ground weight material has a $d_{98}$ between about 32-60 microns.

10. The wellbore fluid of claim 1, wherein the barite-based ground weight material has a $d_{98}$ between about 32-60 microns.

11. The wellbore fluid of claim 1, wherein the barite-based ground weight material has a $d_{99.5}$ between about 48-120 microns.

12. The wellbore fluid of claim 1, wherein the base fluid is one selected from a water-based fluid, an invert emulsion and a direct emulsion.

13. The wellbore fluid of claim 1, wherein the mixed wellbore fluid has a viscosity between about 12,000 and 20,000 cP at 0.17 $s^{-1}$ and between about 1,500 and 2,500 cP at 1.7 $s^{-1}$.

14. The wellbore fluid of claim 1, wherein the mixed wellbore fluid has a viscosity of at least 20 lbs/100 $ft^2$ between 30 and 100 rpm.

15. A wellbore fluid comprising:
    a base fluid; and
    a barite-based weight material ground from barite ore and comprising quartz,
    wherein the weight material has a weight percent of quartz ranging between 4-12 percent,
    wherein the wellbore fluid has a viscosity of at least 20 lbs/100 $ft^2$ between 30 and 100 rpm and a viscosity between about 12,000 and 20,000 cP at 0.17 $s^{-1}$ and between about 1,500 and 2,500 cP at 1.7 $s^{-1}$, and
    further wherein a particle size distribution of the barite-based weight material has a larger size range of particles comprising quartz particles.

16. The wellbore fluid of claim 15, wherein the barite-based weight material is selected from the group consisting of barium sulphate (barite), calcium carbonate, dolomite, ilmenite, hematite, olivine, siderite, and strontium sulphate.

17. The wellbore fluid of claim 15, wherein the barite-based weight material has a specific gravity of less than or equal to about 4.2.

18. The wellbore fluid of claim 15, wherein the barite-based weight material has a $d_{50}$ between about 4-8 microns and a $d_{90}$ between about 15-25 microns.

* * * * *